Dec. 15, 1925.
R. McFARLAN
VALVE
Filed April 13, 1925
1,565,480
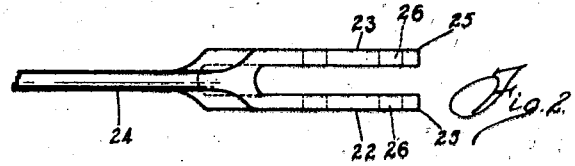
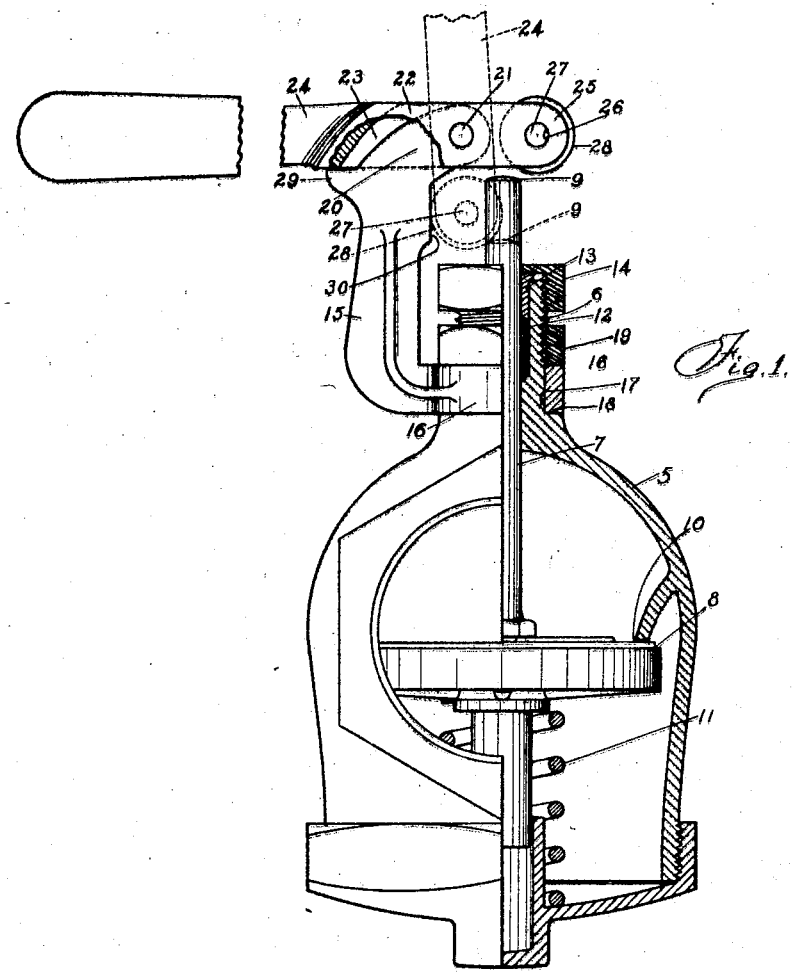
Inventor
Randall McFarlan,
By Murray Ed Rugeeter
Attorneys.

Patented Dec. 15, 1925.

1,565,480

UNITED STATES PATENT OFFICE.

RANDALL McFARLAN, OF CINCINNATI, OHIO.

VALVE.

Application filed April 13, 1925. Serial No. 22,781.

*To all whom it may concern:*

Be it known that I, RANDALL McFARLAN, a citizen of the United States of America, and a resident of Cincinnati, in the county of Hamilton and State of Ohio, have invented new and useful Improvements in a Valve, of which the following is a specification.

This invention relates to valve operating mechanisms and has for an object the provision of an efficient operating device for reciprocating valves.

Another object is to provide a device of this kind which is inexpensive of manufacture and positive in operation.

Another object is to provide a device of this kind in which the wear due to friction in operation is minimized.

These and other objects are attained by the means described herein and disclosed in the accompanying drawings, in which:

Fig. 1 is an elevational view, shown partly in cross section, of a reciprocating globe type valve having embodied therein an operating mechanism of my invention.

Fig. 2 is a fragmental plan view of a lever employed in the device.

The valve comprises the usual casing 5 having a tubular neck portion 6 through which extends a reciprocating stem 7 of a valve 8. The end 9 of the valve stem 7 projects upwardly beyond the top of the neck portion 6 of the casing. The valve 8 is retained upon its seat 10 by means of a compression spring 11. Interiorly of the neck portion 6 is the usual packing 12 and packing collar 13 which surround the valve stem 7 and which are retained in position by means of a packing nut 14 threadedly mounted upon the exterior and upper end of the neck portion 6. The valve structure just described is well known to those conversant with the art.

The operating mechanism of my invention comprises a bracket 15 provided at its one end with a transversely extending ring like portion 16, the bore 17 of which encircles the neck portion 6 of the casing seating upon a suitably shouldered portion 18. A locking nut 19 engaging on the threaded neck portion 6 serves to secure the ring portion 16 of the bracket 15 in any desired position upon the casing 5. The free end of the bracket 15 is developed into a transversely projecting lug 20 which projects for a distance over the ring 16. The lug 20 has a pin 21 suitably journaled therein for pivotally mounting the arms 22 and 23 which form a yoke at one end of an operating lever 24. The ends 25 of the arms 22 and 23 have aligned perforations 26 therein for receiving the ends of the shaft 27 of a roller 28. The centers of pin 21 and roller shaft 27 are positioned on the opposite sides of the valve stem 7, when the operating lever 24 is in the inoperative position which it normally assumes when resting upon abutment shoulder 29 on the bracket 15. When in this position, the valve 8 is held in a closed position by means of the spring 11 and the end 9 of the valve stem 7 is then at its uppermost limit of reciprocation. When it is desired to open the valve 8, the lever 24 is raised, swinging said lever about its pivotal mounting on the lug 20 so that the roller 28 will travel through an arc about the pin 21. As the handle portion of the lever 24 is raised, the roller 28 travels downwardly through an arc as described and abuts the end 9 of the valve stem 7. As the handle is raised farther, the roller 28 exerts a downward pressure on the end of the valve stem 7 and depresses same against the resistance of spring 11 thereby opening the valve. When the lever 24 has been moved to substantially a vertical position the roller will have been moved beyond the center line of the valve stem 7 and its major portion will have traveled beyond the body line of said stem, so that the lever 24 may now be released whereupon the spring 11 will cause the end 9 of the valve stem 7 to exert upward pressure upon the periphery of the roller 28 and to force said roller against the face 30 of the bracket 15 thereby effectively locking the lever and roller against further movement and at the same time holding the end 9 of the valve stem 7 at its lowermost limit of reciprocation and thereby locking the valve 8 in an open position. From the foregoing it will be apparent that the valve mechanism may be operated with a minimum of effort since the provision of the roller 28 reduces to a minimum friction between the end 9 of the valve stem and the surface of the roller so that the force exerted upon the lever 24 is practically all directed to the depression of the spring 11.

As will be apparent to those skilled in the art, the provision of the roller 28 makes it impossible to leave the valve only partly open since the action of the spring on the valve stem will cause the lever to assume either an inoperative position as shown in full lines in the drawings or an operative position as shown in dotted lines therein. The advantage of a structure of this kind over the cam levers sometimes provided in devices of this kind lies in the fact that the cam faces provided in such structures must have a somewhat gradual curve in order to provide easy movement of the lever in overcoming the compression spring in the valve. The frictional engagement of the end of the valve stem upon the gradually curved face of the cam makes it necessary to positively move the lever to its extreme positions in opening and closing the valve and the friction makes it possible to leave the valve in intermediate or practically open positions so that the pressure of a fluid may cause vibration of the valve. In the valve of my invention as soon as the center line of the roller 28 crosses the center line of the valve stem, the action of the spring 11 will cause the roller and lever to move to one of its extreme limits so that the valve is always completely open or positively closed unless the operator chooses to hold the lever in an intermediate position against the resistance of the spring 11.

What I claim is:

1. In a device of the class described the combination with a valve casing having a reciprocating valve stem extending therefrom, a bracket mounted on the casing and having a lug overhanging the casing, of an operating lever pivotally mounted on the lug on one side of the longitudinal center of the valve stem, a roller revolubly mounted on the lever on the opposite side of the longitudinal center of the valve stem when the lever is in inoperative position, and a spring operative upon the valve stem for yieldingly retaining said valve stem at its outermost limit of reciprocation, the lever being adapted to normally assume an inoperative position extending transversely of the valve stem and adapted to be moved about its pivotal mounting whereby the roller is moved through an arc to contact and depress the valve stem against the yielding resistance of the spring until the roller is moved beyond the center line of the valve stem, after which the pressure of the spring on the valve stem will cause the valve stem to further move the roller through its arcuate path into abutment with the bracket whereby the roller is wedged between the valve stem and the bracket for retaining the lever in an operative position in substantial parallelism with the valve stem.

2. In a device of the class described the combination with a casing, of a stem reciprocally mounted in the casing and having an end projecting therefrom, a bracket on the casing, a lug on the bracket, a lever pivotally mounted intermediate its ends on the lug, a roller pivotally mounted on the lever adjacent the lug, the pivotal mountings of the lever and roller being normally disposed on opposite sides of the longitudinal axis of the stem, the lever being adapted to be moved about its pivotal mounting to move the end of said lever and the roller mounted thereon through an arc for depressing the stem and for disposing the pivotal mounting of the roller on the same side of the longitudinal axis of the stem as the pivotal mounting of the lever, and a spring yieldingly resisting depression of the stem and serving to co-operate with the stem to force the roller into abutment with the bracket for locking the parts in the last mentioned position.

3. In a device of the class described the combination with a valve casing having a tubular neck portion, of a valve stem reciprocally mounted in the neck portion, a spring normally retaining the valve stem at one of its limits of reciprocation, a bracket having at its one end a ring portion adapted to encircle the neck portion of the valve casing and at its opposite end a lug overhanging the ring portion, a lever having a pair of arms at one end thereof, said arms being pivotally mounted upon the overhanging end of the bracket, and a roller mounted between the arms on the lever, the lever being adapted to assume an inoperative position at substantially a right angle to the valve stem and to be moved about its pivotal mounting for bringing the roller into contact with the end of the valve stem whereby further movement will cause said roller to depress the valve stem against the yielding resistance of the spring, the body of the bracket intermediate the ring portion and the lug serving as an abutment against which the roller may be forced by the action of the spring upon the valve stem after the roller has been moved beyond the center line of valve stem.

In testimony whereof, I have hereunto subscribed my name this 10th day of April, 1925.

RANDALL McFARLAN.